Dec. 7, 1926.　　　　　　　　　　　　　　　　1,609,712
G. P. GUIGNARD
PROCESS FOR THE DESTRUCTIVE DISTILLATION OF VINASSES
Filed Nov. 6, 1924
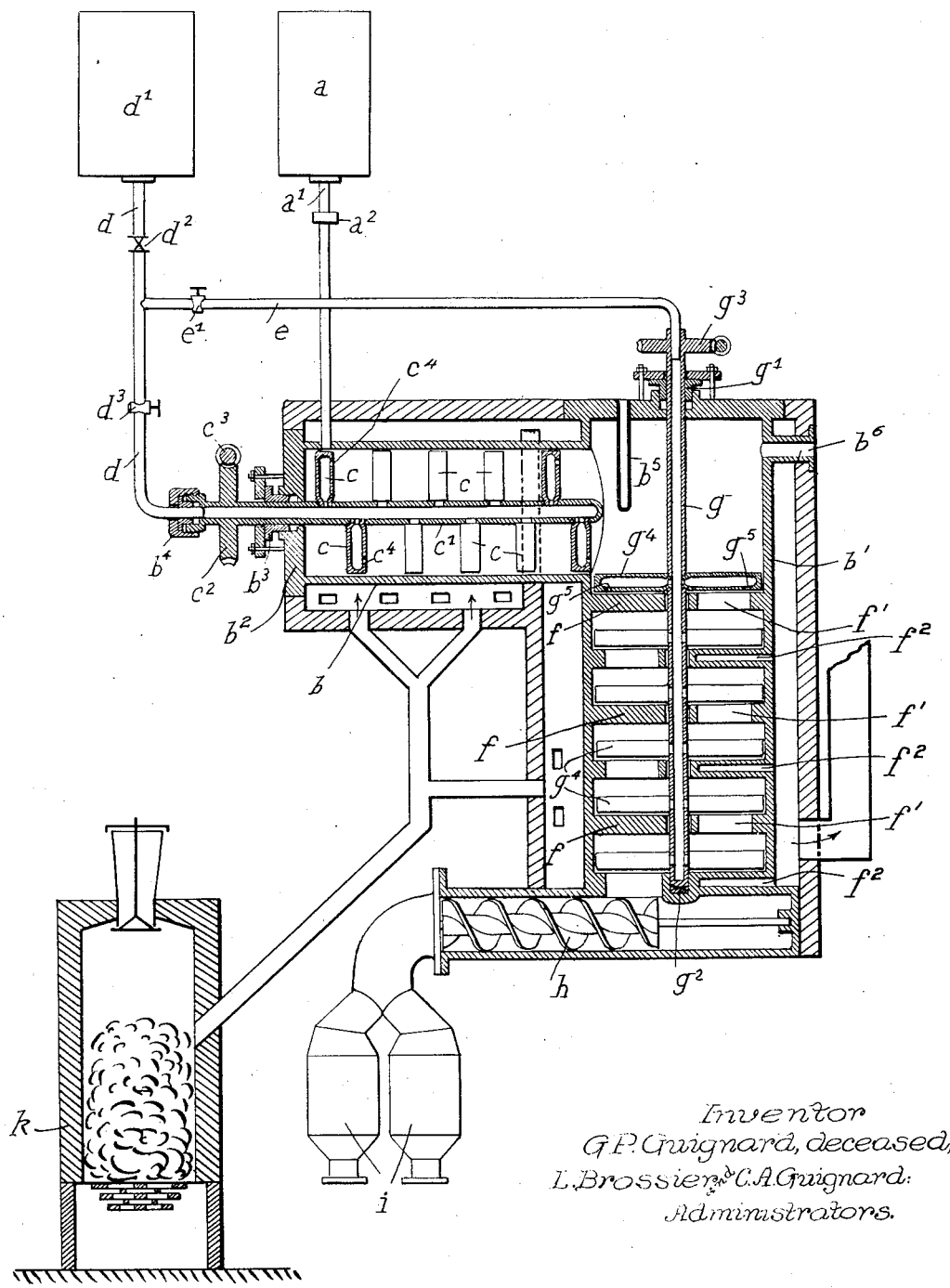
Inventor
G. P. Guignard, deceased,
L. Brossier & C. A. Guignard,
Administrators.

Patented Dec. 7, 1926.

1,609,712

UNITED STATES PATENT OFFICE.

GASTON PHILIPPE GUIGNARD, DECEASED, LATE OF MELUN, FRANCE; BY LEONIE GUIGNARD, NÉE BROSSIER, AND CLAUDE ANDRÉ GUIGNARD, ADMINISTRATORS, OF MELUN, FRANCE.

PROCESS FOR THE DESTRUCTIVE DISTILLATION OF VINASSES.

Application filed November 6, 1924, Serial No. 748,206, and in France November 9, 1923.

The present invention relates to an extraction process, by destructive distillation of useful products (ammonia, methyl alcohol, ethyl alcohol, acetic acid, etc.) which the vinasses of molasses may contain, and more particularly to a process wherein this distillation is effected in the presence of water or steam and under vacuum as described in the application for Patent Ser. No. 510,309 filed October 25, 1921; in which process vinasses are used containing a sufficient quantity of water so that the steam generated passes through the retorts, comes into contact with the vinasses and produces the dissociation of the nitrogenous substances which they contain.

The inventor has found that a much better yield is obtained from the point of view of quality and quantity of the recovered products and particularly of ammonia, by continuously introducing water or steam little by little, during the destructive distillation itself, into the midst of the mass subjected to a continuous agitation during the distillation under vacuum in such a manner as to produce intimate and direct action of the water or steam on the vinasses which are decomposing.

Too great a quantity of water, suddenly introduced during the distillation, would not give favorable results. Likewise when water or steam is already contained in the mass of vinasses, as a result of the heat in the distilling retort, the moisture is dispersed into the atmosphere and is quite insufficient in quantity so that it acts only superficially on the mass being distilled.

The steam or water in the distillation process of the vinasses must act as a chemical reagent, and therefore, must be present in the distilling mass at the moment of decomposition of the mass.

If the moisture is absent, the vinasse becomes dried due to its introduction into the retort which is heated to 450° C. or higher, and is subjected to a vacuum. It, therefore, remains a dry mass containing all the constituent elements of the vinasse, that is, salts, nitrogenous matters, glucoses, organic gases (malic, citric etc.). These constituent elements, deprived of moisture at the moment of the destructive decomposition of the vinasse become transformed in a quite different manner from what is indicated in the described process.

The proof of the importance of this introduction of steam into the center of the mass being distilled, according as, and in proportion to, the distillation, is given by the examples which follow:—

When water or steam is introduced in advance into the mass to be distilled, that is to say, when the quantity of water or of steam present in the mass at the moment of the destructive decomposition is insufficient, there is obtained from a vinasse containing 100 parts of nitrogen:

| | Per cent. |
|---|---|
| Ammonia ($NH_3$) | 42.9 |
| Nitrogen in the tars | 30.1 |
| Nitrogen in the salts | 11.2 |
| Nitrogen lost | 15.8 |

When the water or steam is introduced in a continuous manner, and gradually, into the heart of the mass during the distillation of the mass, as described in applicant's specification, thus assuring a sufficient quantity of steam at the moment of the destructive decomposition of the vinasse, the process taking place under the same conditions of temperature and of vacuum as in the example above, there is obtained:

| | Per cent. |
|---|---|
| Ammonia $NH_3$ | 87.02 |
| Nitrogen in the tars | 4.20 |
| Nitrogen in the salts | 6.88 |
| Nitrogen lost | 1.90 |

Thus it is seen that in carrying out the process under the conditions specified above and described in this specification, a maximum quantity of ammonia is obtained, and this ammonia is free from trimethylamine and is immediately usable.

The two above examples sharply set forth the importance of the particular manner of introducing the water or the steam according to this invention and show the greatly increased quantity of ammonia obtained by proceeding along the lines of this invention.

For example, if the water or steam does not act directly and intimately on the mass, then for 100 parts nitrogen contained in the vinasses, 11.2 per cent of nitrogen remains in the salts, whilst when operating as indicated above only 6.88 per cent of nitrogen remains in the salt.

The water, as is known, exerts a chemical action on the betaine which it decomposes into acetic acid, methyl alcohol, and ammonia; with asparagine it produces ethyl alcohol, carbonic acid and carbonate of ammonia.

It is known that organic nitrogenous materials treated with alkalies produce cyanides; this is the case with vinasses which contain betaine and asparagine and salts of potash. It is for this reason that, when the water does not reach the heart of the mass itself, a considerable amount of nitrogen remains in the salts in the form of alkaline cyanides.

The quality and quantity of the products recovered depends, not only on the presence of steam in the heart of the mass which is being distilled, but also on the pressure and temperature.

Thus, for example, for a vacuum of 400 mm. of mercury (that is to say a pressure of 360 mm.) there are obtained 42.9 per cent of ammoniacal nitrogen, 30 per cent organic nitrogen (in the form of indol, scatol, pyrrol, etc.) and 15.8 per cent losses in nitrogen; for a vacuum of 600 mm. (that is to say a pressure of 160 mm.) of mercury, there are obtained respectively 71.4 per cent ammoniacal nitrogen, 22 per cent organic nitrogen and 3.7 per cent loss in nitrogen; for a vacuum of 700 mm. 87 per cent ammoniacal nitrogen, 6.88 per cent organic nitrogen and 1.9 per cent loss in nitrogen. The temperature, which should be kept constant during the distillation, varies with the results to be obtained; it may reach 600 to 650° C. if it is desired to recover the whole of the ammonia; it should not exceed 450° C. if it is desired to recover the non-nitrified organic products at the same time as the ammonia.

It is possible, as indicated above, to introduce into the heart of the mass water or steam. Water has mechanical advantages over steam; in circulating in the injection means it prevents these from attaining the distillation temperature and consequently increases their resistance and prevents deformation thereof.

The water or steam should be introduced in a measured proportion so as to obtain sufficiently concentrated distillation liquids for effecting economic recovery of the organic compounds.

The invention also relates to an apparatus for carrying out this process; this apparatus is characterized by the use of one or more agitators for the circulation of water or steam which is injected into the heart of the mass.

These agitators, for example, may be provided with hollow blades or arms which communicate with the hollow shaft through which the water or steam is supplied and which are provided with orifices for injecting this into the mass.

The accompanying drawing illustrates, but by way of example only, a view in vertical axial section, partly in elevation of one form of construction of this apparatus.

The vinasses concentrated to the required content in water, contained in measuring tank $a$, pass through a pipe $a^1$ into the horizontal portion $b$ of a distillation retort also provided with a vertical portion $b^1$. The pipe $a^1$ is provided with a cock $a^2$ insuring a supply of vinasse corresponding with the output of the apparatus.

In the horizontal portion $b$ of the distillation apparatus, the vinasses are pushed forward by the blades $c$ of an agitating shaft $c^1$ rotated slowly by a helicoidal wheel $c^2$ and a worm $c^3$. The shaft $c^1$ and the blades $c$ are hollow and communicate freely with one another. The shaft $c^1$ extends through the cover $b^2$ of the retort, passing through a gland $b^3$ forming a fluid-tight joint; the shaft $c^1$ is attached by a gland $b^4$ to a pipe $d$ extending from a measuring tank $d^1$ containing hot water; this pipe $d$ is provided with a branch pipe $e$ of which the use will be described hereinafter; an ordinary cock $d^2$, provided between the tank $d^1$ and the branch pipe, controls the supply of hot water from the tank $d^1$, and needle valves $d^3$ and $e^1$ are provided in the pipes $d$ and $e$ beyond the branch pipe for separately controlling these pipes.

The hot water, preferably heated to about 100° C. passes, in a suitably measured quantity, through the pipe $d$ and hollow shaft $c^1$ into the hollow blades $c$, which at their outer portion are provided with injection holes $c^4$ for distributing the water into the heart of the mass of vinasses.

The material to be distilled is caused, by the action of these blades, to fall on the first plate $f$ of a column of plates located in the vertical portion $b^1$ of the distilling apparatus. The superposed plates $f$ are provided with a central hole for the passage of a vertical agitating arm $g$ suitably mounted in bearings $g^1$ $g^2$ and rotated slowly by helicoidal gear $g^3$ at the upper end thereof. The blades $g^4$ of the agitator are also hollow and freely communicate with the shaft $g$ which is connected to the pipe $e$, above referred to; these blades $g^4$ are also provided with holes $g^5$ for the injection of hot water, supplied, in a suitably measured quantity, by the pipe $e$ and hollow shaft $g$, to the heart of the mass which is being distilled. These blades cause the material to fall from one plate $f$ to the next through the openings $f^1$ provided helically in the column of plates $f$. The speed of rotation of the agitating shaft and the sections of the blades is calculated so that the material reaching the bottom of the vertical column of plates has nothing further for distillation.

The plates $f$ are provided with borings $f^2$ enabling the introduction of portable pyrometers for controlling the temperature of each plate; another fitting $b^5$ for a pyrometer, is provided at the upper end of the distillation apparatus.

A screw conveyor $h$, located below the column of plates $f$, conducts the residue of the distillation to an extractor with double sieves $i\ i$, for extracting the products in a continuous and uninterrupted manner in vacuo.

The pipe $b^6$, for the outflow of the products of distillation, connects the retort to a vacuum pump, by means of a refrigerant and sulphuric acid scrubbers (not illustrated).

The entire distillation apparatus is placed in refractory masonry forming a furnace; the heating may be effected either by direct firing or by gases of a gas producer as shown at $k$ on the drawing.

What we claim is:—

A process for the destructive distillation of vinasses under vacuum and in the presence of moisture, comprising, gradually and continuously introducing moisture, during the entire period of the destructive distillation, into the heart of the mass being distilled, and continuously agitating the mass during distillation at a temperature of about 450 to 650 degrees centigrade.

In testimony whereof, we have signed our names to this specification.

LEONIE GUIGNARD, NEE BROSSIER.
CLAUDE ANDRE GUIGNARD,
*Administrators of the Estate of Gaston Philippe Guignard, Deceased.*